(12) United States Patent
Jarry et al.

(10) Patent No.: US 12,735,340 B2
(45) Date of Patent: Sep. 15, 2026

(54) PROCESS FOR THERMOPROCESSING A CHARGE

(71) Applicant: L'Air Liquide, Société Anonyme pour l'Etude et l'Exploitation des Procédés Georges Claude, Paris (FR)

(72) Inventors: Luc Jarry, Malakoff (FR); Martin Graebner, Frankfurt am Main (DE); Jean Caudal, Versailles (FR)

(73) Assignee: L'Air Liquide, Societe Anonyme Pour l'Etude et l'Exploitation des Procedes Georges Claude, Paris (FR)

( * ) Notice: Subject to any disclaimer, the term of this patent is extended or adjusted under 35 U.S.C. 154(b) by 416 days.

(21) Appl. No.: 18/284,011

(22) PCT Filed: Mar. 15, 2022

(86) PCT No.: PCT/EP2022/056711
§ 371 (c)(1),
(2) Date: Sep. 25, 2023

(87) PCT Pub. No.: WO2022/200127
PCT Pub. Date: Sep. 29, 2022

(65) Prior Publication Data

US 2024/0166546 A1 May 23, 2024

(30) Foreign Application Priority Data

Mar. 25, 2021 (EP) .................................... 21165009

(51) Int. Cl.
*C01B 3/12* (2006.01)
*C03B 5/235* (2006.01)
*C03B 5/237* (2006.01)

(52) U.S. Cl.
CPC .......... *C03B 5/237* (2013.01); *C03B 2207/38* (2013.01)

(58) Field of Classification Search
CPC ......... C03B 5/027; C03B 5/235; C03B 5/237; C01B 3/12
See application file for complete search history.

(56) References Cited

U.S. PATENT DOCUMENTS 3,885,945 A * 5/1975 Rees ......................... C03B 5/04 373/29
2009/0313886 A1* 12/2009 Hinman .................. F01K 13/00 44/302

(Continued)

FOREIGN PATENT DOCUMENTS

CN 102173559 B 4/2013
WO WO-2017077421 A1 * 5/2017 ............... C01B 3/02

OTHER PUBLICATIONS

Van Cappellen, L. et al., feasibility study into blue hydrogen, technical, economic & sustainability analysis, CE Delft , Jul. 2018, 42 pgs., downloaded from https://cedelft.eu/wp-content/uploads/sites/2/2021/04/CE_Delft_9901_Feasibility_study_into_blue_hydrogen_DEF_bak.pdf.

(Continued)

*Primary Examiner* — Steven S Anderson, II
(74) *Attorney, Agent, or Firm* — Allen E. White; Elwood L. Haynes

(57) ABSTRACT

Process for thermoprocessing a non-gaseous charge in a furnace (13), whereby) carbon dioxide released by the charge during said thermoprocessing, a non-zero fraction (7) of the flue gas (6) which contains said released carbon dioxide being combined with hydrogen (3) and subjected to a rWGS reaction with said hydrogen (3), whereafter the reaction product (9) of the rWGS reaction is supplied to the furnace (13) as fuel.

14 Claims, 1 Drawing Sheet

(56) References Cited

U.S. PATENT DOCUMENTS

| | | | | |
|---|---|---|---|---|
| 2016/0083810 | A1* | 3/2016 | Kuhl | C21B 7/002 75/464 |
| 2018/0283789 | A1* | 10/2018 | Kobayashi | C03B 5/237 |

OTHER PUBLICATIONS

International Search Report and Written Opinion for corresponding PCT/EP2022/056711, Jun. 15, 2022.

* cited by examiner

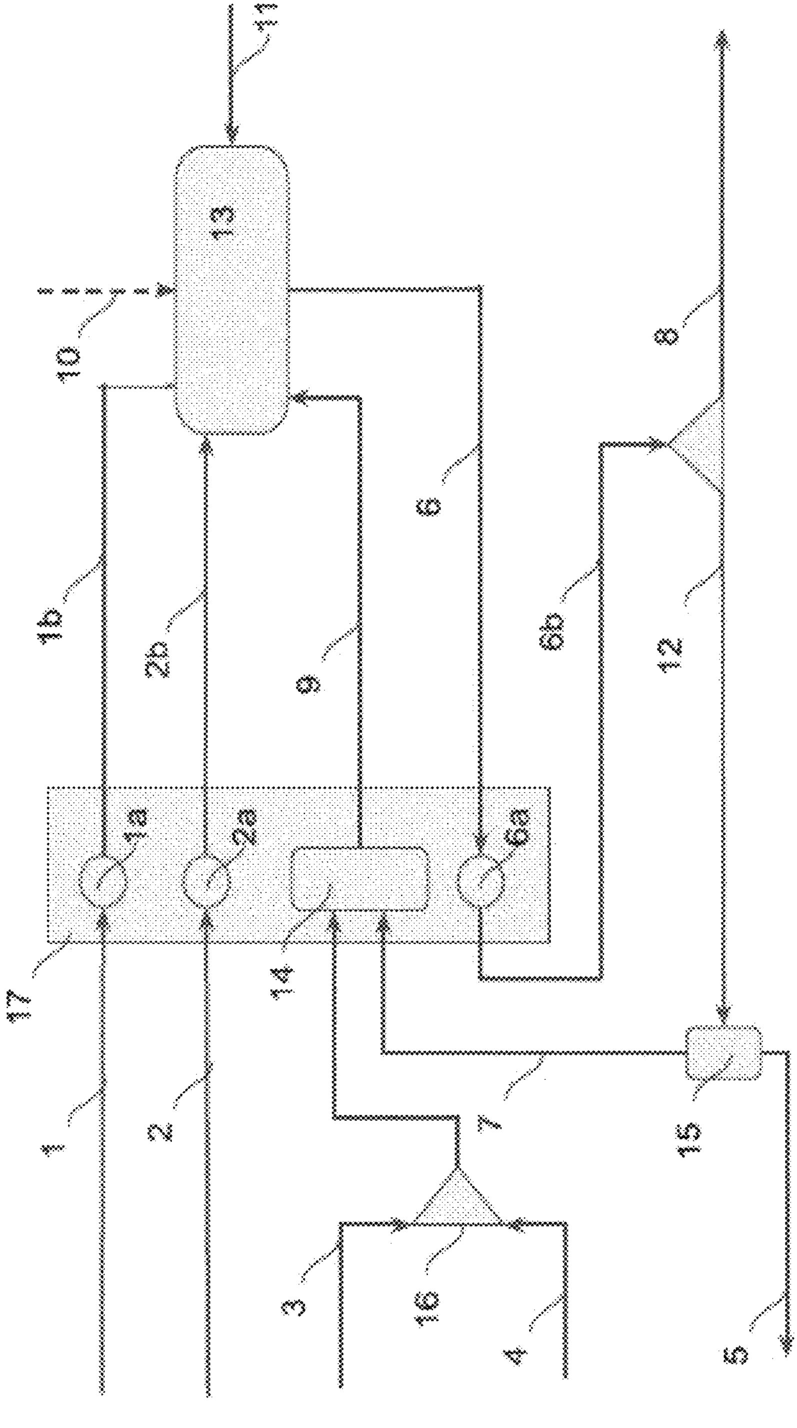
1
1a
1b
2
2a
2b
3
4
5
6
6a
6b
7
8
9
10
11
12
13
14
15
16
17

PROCESS FOR THERMOPROCESSING A CHARGE

CROSS REFERENCE TO RELATED APPLICATIONS

This application is a 371 of International Application No. PCT/EP2022/056711, filed Mar. 15, 2022, which claims priority to European Patent Application No. 21165009.8, filed Mar. 25, 2021, the entire contents of which are incorporated herein by reference.

BACKGROUND

The present invention relates to processes whereby a non-gaseous charge is thermoprocessed in a furnace heated by combustion of fuel with oxidant.

Hydrocarbon fuels have long been used for heating furnaces, with natural gas being often preferred due to its combination of low price, high purity and ease of control, though the use of biogas is increasingly promoted.

An inconvenience of hydrocarbon-containing fuels is that their combustion generates carbon dioxide.

Substituting heating by combustion with electric heating can only be part of a pathway towards decarbonization of industrial furnaces, if a reliable and stable power grid generating sufficient electricity from renewable energy sources is available.

Moreover, not all processes of thermoprocessing a charge in a furnace lend themselves to the complete or partial substitution of heating by combustion with electric heating. Heating by combustion of fuel with oxidant will thus remain a feature in industrial furnaces.

The use of hydrogen as an alternative, non-hydrocarbon fuel has also been proposed to reduce carbon-dioxide emissions.

As is the case for electric heating, the replacement of hydrocarbon fuel with hydrogen can only contribute to carbon-footprint reduction when the hydrogen is generated using renewable energy sources.

In addition, the properties (such as flame volume, combustion gas composition, etc.) of hydrogen flames differ significantly from those of hydrocarbon flames, so that flames generated with hydrogen as the fuel are not suited for all industrial thermoprocessing furnaces in which hydrocarbon fuel is traditionally burnt.

SUMMARY

It is an aim of the present invention to provide an efficient method for thermoprocessing a charge in a furnace with reduced or no hydrocarbon combustion in those cases whereby the charge releases carbon dioxide gas during thermoprocessing.

According to the present invention, the reduction or elimination of hydrocarbon combustion is achieved through the effective use of the carbon dioxide released by the charge during its thermoprocessing.

According to one embodiment, the present invention relates to a process whereby a charge is thermoprocessed in a furnace heated by combustion of fuel with oxidant.

In the present context, the term 'thermoprocessing' refers to a process whereby the chemical and/or physical properties (other than the mere temperature) of a non-gaseous charge are modified under the effect of heat. Examples of such thermoprocessing are: melting (such as glass melting), sintering, incineration, vitrification and (re)crystallisation (such as during metal reheating/annealing).

In the process according to the invention, the non-gaseous charge to be thermoprocessed is introduced into a furnace. The furnace is heated by means of combustion of fuel with oxidant, said fuel and oxidant being supplied to the furnace at regulated/controlled supply rates. A furnace atmosphere is generated in the furnace which consists of a gaseous mixture comprising (a) combustion gas generated by the combustion of fuel with oxidant and (b) carbon dioxide released by the charge during thermoprocessing. The furnace atmosphere may also contain and often does contain additional components, such as substances other than $CO_2$ released by the charge during thermoprocessing, ingress air, etc.

The thermoprocessed charge is withdrawn from the furnace and the carbon-dioxide containing gaseous mixture is evacuated from the furnace as flue gas.

In accordance with the present invention, hydrogen is supplied to the process. A non-zero fraction of the flue gas is combined with at least part of the supplied hydrogen, said flue-gas fraction containing at least 50% vol and at most 100% vol $CO_2$.

The flue-gas fraction is then subjected in a reverse Water Gas Shift (rWGS) reactor to the rWGS reaction with said hydrogen, so that at least part of the $CO_2$ in the flue-gas fraction is converted into CO.

The CO-containing reaction product of the rWGS reaction is then supplied to the furnace as part or all of the fuel to be combusted.

In the present context, the term 'gaseous mixture' refers to a gaseous medium comprising more than one gaseous compound. In addition, a 'gaseous mixture' may also contain liquid droplets or solid particles, such as soot and dust, suspended in the gaseous phase.

The $CO_2$ release by the charge may, for example, be due to the combustion of combustible matter present in the charge and/or some other chemical reaction taking place in the charge during thermoprocessing, such as decarbonization.

As a consequence of the presence of the rWGS reaction product in the fuel, the properties of the flame generated by the combustion resemble more closely the properties of hydrocarbon flame than if only hydrogen were to be combusted.

In addition, the $CO_2$ released by the charge and evacuated from the furnace as flue gas is effectively used to improve the thermoprocessing.

The rWGS reaction is known in the art and may be performed as a catalytic or a non-catalytic reaction. It is, for example, known from US-A-2016/0083810, to use the rWGS reaction to convert $CO_2$ to CO, whereafter part of the produced CO is supplied to a blast furnace shaft as a reducing agent for the chemical reduction of metal ore therein, while a further portion of the produced CO is directed to a further processing process.

The hydrogen which is supplied to the process is preferably hydrogen with a low or zero carbon footprint, for example so-called blue or green hydrogen. Green $H_2$ is $H_2$ produced with zero $CO_2$ emissions, for example through water electrolysis using renewable power. Blue $H_2$ presents an emission intensity of up to 0.97 kg $CO_2$/kg $H_2$ and may, for example, be produced by steam methane reforming with carbon capture. (van Cappellen, L., Croezen, H. & Rooijers, F. "Feasibility Study into Blue Hydrogen". CE Delft, 2018)

The $CO_2$ content of the fraction of flue gas which is combined with hydrogen and subjected to the rWGS is advantageously as high as possible. The water content of the fraction is preferably as low as possible. In particular, the flue-gas fraction advantageously contains at least 80% vol, preferably at least 90% vol and more preferably at least 98% vol $CO_2$. Its humidity level is advantageously from 0 to 20% vol $H_2O$, preferably at most 10% vol $H_2O$.

The flue-gas fraction which is sent to the rWGS reactor may simply be a portion of the evacuated flue gas and thus have the same composition, and in particular the same $CO_2$ and $H_2O$ content as the flue gas which is evacuated from the furnace. Preferably, the fraction of flue gas which is sent to the rWGS has a $CO_2$ content which is higher than the $CO_2$ content of the flue gas evacuated from the furnace and/or a water content lower than that of the flue gas evacuated from the furnace, preferably both a higher $CO_2$ content and a lower $H_2O$ content.

Such a $CO_2$-enriched flue-gas fraction is obtained by partially or totally removing one or more components other than $CO_2$ from the flue gas. A particularly effective method for obtaining a $CO_2$-enriched flue-gas fraction is by removing water therefrom (dehumidification), for example through water condensation. In order to extract water from the flue gas by condensation, the flue gas is cooled to the water condensation temperature or below. According to a useful embodiment, the $CO_2$-enriched flue-gas fraction is reheated downstream of the water condensation step and upstream of the rWGS reaction, preferably using residual heat recovered from the evacuated flue gas.

In addition to water, other substances, such as for example dust particles, may be removed from the flue-gas fraction during condensation. If necessary or appropriate, one or more additional flue-gas cleaning steps may be included in the process.

Waste heat available on-site may be used to provide energy (heat) required for the rWGS reaction.

In most processes for thermoprocessing a non-gaseous charge in a furnace, the flue gas is evacuated from the furnace at high temperature. For example, glass melting is usually realized in furnaces in which the flue gas is evacuated at temperatures between 1300° C. and 1600° C., depending on the operating conditions and the glass requirements.

In such a case, residual heat present in the evacuated flue gas may be put to use in the rWGS reaction. In the present context, the expression "residual heat" refers to the thermal energy evacuated from the furnace via the evacuated flue gas and which was therefore not transferred to the charge inside the furnace.

When the evacuated flue gas contains sufficient residual heat, the energy efficiency of the process can be improved by recovering heat from the evacuated flue gas and by supplying at least part of the heat recovered from the evacuated flue gas to the rWGS reaction.

The heat-recovery process may be or include an indirect heat recovery process, whereby heat is first transferred from the flue gas to a solid or fluid heat-recovery medium and whereby heat thus recovered is then transferred from the heat-recovery medium to the supplied hydrogen and/or to the flue-gas fraction and/or to the combined flue-gas fraction and hydrogen and/or to the rWGS reactor itself and is thus made available for the rWGS reaction.

Heat may thus be recovered from the flue gas by heating a heat-recovery fluid by heat exchange with the evacuated flue gas, and the thus recovered heat may be supplied to the rWGS reaction by:

heating the flue-gas fraction by heat exchange with the heated heat-recovery fluid upstream of the rWGS reaction and/or heating supplied hydrogen by heat exchange with the heated heat-recovery fluid upstream of the rWGS reaction and/or heating the combined flue-gas fraction and hydrogen and/or heating the reactor in which the rWGS reaction takes place by heat exchange with the heated heat-recovery fluid.

The heat-recovery process may also be or include a direct heat recovery process, i.e. without intermediate heat-recovery medium, in that:

the flue-gas fraction is heated by heat exchange with evacuated flue gas from the furnace upstream of the rWGS reaction and/or supplied hydrogen is heated by heat exchange with evacuated flue gas upstream of the rWGS reaction and/or the combined flue-gas fraction and hydrogen and/or heating the reactor in which the rWGS reaction takes place are heated by heat exchange with evacuated flue gas.

Direct heat recovery is typically performed in a heat exchanger, in which the fluid acting as a heat source and the fluid to be heated thereby are in thermal contact with one another across a heat-exchange surface, while being kept physically separated from one another (no mixing) by said heat-exchange surface.

Instead of or in combination with the supply of heat recovered from the evacuated flue gas to the rWGS reaction, heat recovered from the evacuated flue gas may also be used for:

oxidant preheating and/or fuel preheating and/or drying and/or preheating of the non-gaseous charge.

In the present context, the term "preheating" is used to describe the heating of a material to be introduced into the furnace, such as an oxidant, a fuel or all or part of the non-gaseous charge, before the material in question is introduced into the furnace.

Using residual heat from furnace flue gas to preheat oxidant and/or fuel by direct or indirect heat exchange is known in the art.

In the case of hydrocarbon fuel, the level (temperature) to which the fuel can be preheated is limited by phenomena such as fuel cracking.

Even though hydrogen is not subject to cracking, the amount of residual thermal energy which can be recycled to the furnace by hydrogen preheating is limited because of its low mass flow.

In the process according to the invention, the heating of the furnace by means of combustion of fuel with oxidant may be combined with ways of heating the furnace, such as, for example, electric heating.

Various ways of combusting fuel with oxidant may be used in the context of the present invention. For example, fuel may be combusted with oxidant in the furnace in a single or in multiple flames. Fuel may also be combusted with oxidant in the furnace using staged or delayed combustion. According to a specific embodiment, fuel may be combusted with oxidant by so-called flameless combustion, which is a form of highly staged combustion. These combustion methods are, as such, known in the art.

According to one embodiment, all of the hydrogen supplied to the process is combined with the flue-gas fraction and subjected to the rWGS reaction as described above.

According to an alternative embodiment, a first part of the hydrogen supplied to the process is combined with the flue-gas fraction and subjected to the rWGS reaction, while a further part of the hydrogen supplied to the process is injected into the furnace as additional fuel admixed with and/or separately from the reaction product of the rWGS reaction.

In certain cases, it may also be useful for a gaseous hydrocarbon-containing fuel to be supplied to the process and injected into the furnace as additional fuel in addition to the rWGS reaction product. Said gaseous hydrocarbon-containing fuel may be injected into the furnace admixed with the reaction product of the rWGS reaction and/or separately therefrom. In order to keep the carbon footprint of the process as low as possible, the amount of hydrocarbon-containing fuel injected into the furnace is kept as low as possible and/or hydrocarbon fuel which is injected into the furnace is preferably sourced from a renewable source. Preferably, the energy supply to the process by means of hydrocarbon-containing fuel is not greater than the energy supply to the process by means of hydrogen. Typically, the energy supply by means of hydrocarbon-containing fuel shall be less than the energy supply by means of hydrogen (i.e. less than 100% of the energy supply by means of hydrogen), in particular less than 50%, preferably less than 20% of the energy supply by hydrogen to the process. However, it will be appreciated that the use of higher levels of hydrocarbon-containing fuel may be required to heat the furnace during startup or during interruptions of the thermoprocessing of the charge, i.e. when less or no $CO_2$ is released by the charge for the rWGS reaction.

By combining the heating of the furnace by the combustion of the rWGS reaction product with other sources of thermal energy, such as electric heating or the combustion of an additional fuel, possibly both, the flexibility of the process is increased in that it is thereby made possible to meet the (varying) heat requirement of the furnace independently of the level of $CO_2$ release by the charge in the furnace.

According to an advantageous embodiment, the process comprises the step of automatically regulating the amount of additional fuel which is injected into the furnace in addition to the reaction product of the rWGS reaction so that the instantaneous heat requirement of the furnace is met. For the automatic regulation of the amount of additional fuel which is injected into the furnace, a control unit is used which takes into account all sources of thermal energy supplied to the furnace, i.e. including, if present, electric heating, preheating of the rWGS reaction product, preheating of the additional fuel, oxidant preheating and charge heating, if present. The automatically regulated amount of additional fuel which is injected into the furnace and the injected amount of rWGS reaction product thus together meet the instantaneous combustion heat requirement of the furnace.

The control unit may also be used to regulate the amount of oxidant which is injected into the furnace, or, more specifically to regulate the amount of oxygen which is introduced into the furnace by means of the injected oxidant. Depending on the furnace and the type of thermoprocessing process (e.g. the nature of the charge), the control unit may regulate the amount of oxidant which is injected into the furnace as the amount of oxidant stoichiometrically required for the combustion of all of the injected fuel. However, the regulated amount of oxidant injected into the furnace may also differ from said stoichiometric amount. For example, the control unit may control the injected amount of oxidant so as to maintain a reducing or an oxidizing atmosphere in the furnace, in particular so as to avoid undue oxidation or reduction of the charge during thermoprocessing. The control unit may also take into account the amount of oxygen entering the furnace as uncontrolled ingress air, and deduct the ingress-air oxygen from the regulated amount of oxygen to be injected into the furnace with the oxidant. The control unit may also be adapted to take into account any combustible matter which may be present in or released by the charge during thermoprocessing and increase the amount of oxygen to be injected into the furnace so as to combust said combustible matter, at least in part, inside the furnace. Methods and systems for thus regulating and adjusting the amount of oxidant to be injected into a furnace are known in the art and may include a method or a system for detecting a presence and/or a level of combustible substances in the furnace flue gas.

In addition, when thermal energy is also provided to the furnace by electric heating, the control unit may be used to regulate the electric heating and the amount of thermal energy supplied thereby.

The oxidant used may be air. It is often preferred to use an oxidant having an oxygen content higher than that of air. For example, the oxidant usefully has an oxygen content of 70% to 100% vol, preferably of at least 85% vol, more preferably of at least 95% vol. Due to the reduced amount of inactive ballast gas in high-oxygen oxidant, compared to the 78% vol $N_2$ in air, the heating efficiency of the combustion can be improved.

As indicated earlier, in accordance with the present invention, the $CO_2$ released by the charge during thermoprocessing is used to improve the thermoprocessing. One particular effect of subjecting the supplied hydrogen to the rWGS reaction with $CO_2$ released by the charge is that a flame is obtained which more closely resembles a hydrocarbon flame. In addition to or instead of $CO_2$ released by the charge during thermoprocessing, $CO_2$ from an external source may also be used for the rWGS reaction. The use of external $CO_2$ is, for example, useful to allow hydrogen to be subjected to the rWGS during startup or when the thermoprocessing of a charge in the furnace is interrupted, or when a charge which releases little or no $CO_2$ during thermoprocessing is being processed in the furnace (such as, for example, cullet in a glass-melting furnace). In such a case as well, $CO_2$ from other sources may be used in the process. To keep the carbon footprint as low as possible, $CO_2$ available from other sources on-site is preferably used in this case. The method according to the present invention then contributes to the reduction of the carbon footprint of the site.

As indicated earlier, the present invention is applicable to a wide range of thermoprocessing processes, including, in particular, processes other than those for the chemical reduction of metal ore.

The present invention is of particular interest for glass-melting processes and furnaces.

The production of glass includes the process producing molten glass by melting solid glass-forming material. For this purpose, solid glass-forming material is introduced into a furnace, where it is heated and melted. This melting process is energy-intensive.

Both combustion and electricity have, separately and in combination, been used to generate the necessary heat.

In industrial electric glass-melting furnaces, the melting energy is supplied by electrodes (joule heat) immersed in the glass-forming material, so that all generated heat is transferred to the glass-forming material surrounding the electrodes.

100% electric industrial glass melting furnaces, also referred to as electric glass melters (EMs) have relatively low capital costs, but also short life-times (2-7 years) and high energy costs. The economic viability of electric furnaces is closely related to the cost of electricity compared to the cost of hydrocarbon fuel.

As a consequence, EMs are typically used for specialty glasses, in particular glasses with significant volatile constituents, such as fluoride opal glasses, borosilicates and lead crystal. EMs typically have production capacities in the range of 10 to 100 Tons of glass produced per day (tpd). Only about 50 EM units worldwide have a production capacity between 100 and 250 tpd. EMs account for less than 5% of glass furnaces worldwide.

In addition, even the use of entirely carbon-free electricity cannot fully decarbonate the glass-melting process. Indeed, in almost all cases, carbon dioxide will be released by the charge during melting and/or refining. In practice, the Production of 1 kg of glass generates on average approximately 0.15 kg of $CO_2$ from dissociation of carbonate raw material (such as CaCO3 and dolomite) in the solid glass-forming material. The amount of $CO_2$ released is directly linked with the type of glass and the use of recycled glass, also referred to as cullet. A possible exception is the production of glass based entirely on clean recycled glass/cullet, but these processes account for only a very small portion of the glass-melting industry.

The $CO_2$ released by the charge of glass-forming material not only contributes to the carbon dioxide emissions of the glass-production process, it also constitutes a source of energy loss in that, thermal energy is consumed during the generation of the $CO_2$ and during the heating of the generated $CO_2$ to the temperature of the furnace atmosphere, whereafter the heated $CO_2$ is evacuated from the furnace as part of the furnace flue gas. This $CO_2$ thus absorbs part of the heat supplied to the furnace and acts as ballast evacuating additional heat from the furnace due to the increased amount of furnace flue gas.

Most glass-melting furnaces rely entirely or mainly on hydrocarbon fuel combustion for their energy requirements, alone or in combination with electric heating. Natural gas has long been the preferred hydrocarbon fuel. Natural-gas furnaces have long life-times, on average over 12 years and sometimes up to 20 years.

New technologies enabling air to be replaced with oxygen-enriched air or oxygen have been developed to reduce NOx emissions and/or to improve the energy-efficiency of combustion-heated glass-melting furnaces.

As indicated earlier, substituting (part of) the energy requirement of the glass-melting furnace with electric heating or hydrogen combustion can only be a factor in reducing overall $CO_2$ emissions, when said electricity or hydrogen is produced using renewable resources.

In addition, hydrogen flames are less voluminous, and thus provide less coverage (in terms of surface area) of the glass-forming material. This problem is compounded when oxygen is used as the oxidant for combustion.

Moreover, hydrogen flames have a higher $H_2O$ content than the corresponding hydrocarbon flames. High $H_2O$ partial pressures in the furnace atmosphere have been linked to formation of an insulating foam layer on the molten glass.

When, in the process according to the invention, the furnace is a glass-melting furnace, solid glass-forming material to be melted is introduced into the furnace as the charge to be thermoprocessed and molten glass is withdrawn from the furnace as the thermoprocessed charge. When the glass-melting material is only subjected to melting in the process/furnace, the thermoprocessing to which the charge is subjected consists of melting. When the glass-melting material is subjected to both melting and refining in the process/furnace, then the thermoprocessing to which the charge is subjected consists of the combination of melting and refining, in that order. Carbon dioxide is released into the furnace atmosphere by the glass-forming material during its thermoprocessing, as discussed above.

As a consequence of the presence of the rWGS reaction product in the fuel, a more voluminous and more radiant flame is obtained above the charge compared to if the hydrogen had been supplied to the furnace as part or all of the fuel without the rWGS reaction with the flue-gas fraction.

This results in more effective heating of the glass-forming material.

Moreover, the $H_2O$ partial pressure in the furnace atmosphere is lower compared to if the hydrogen had been supplied to the furnace as part or all of the fuel without the rWGS reaction with the flue-gas fraction.

In addition, as already indicated above, part of the $CO_2$ released by the charge and evacuated from the furnace as flue gas is recycled and used to improve the energy efficiency in the furnace.

In the case of glass-melting furnaces, the flue gas is evacuated at high temperature (for example between 1300° C. and 1600° C.). Said flue gas thus contains high levels of residual heat, which can, at least in part be supplied to the rWGS reaction.

Consequently, heat recovery from the flue gas by any of the methods described earlier, is particularly useful for glass-melting processes.

In accordance with a particular embodiment, the heating of the furnace by means of combustion of fuel with oxidant is combined with electric heating of the furnace. In particular, the furnace may be simultaneously heated both by means of the abovementioned combustion of fuel with oxidant and by means of electrodes immersed in the glass-forming material.

According to one such process, electric heating is used to boost the melting process. In the present context, 'electrical boosting' refers to processes whereby between 5 and 50%, preferably between 20 and 50% of the energy supplied to the furnace is supplied to the furnace via electric heating by means of the electrodes.

According to an alternative embodiment, the process is a hybrid melting process. In hybrid processes, between 30 and 95, preferably between 50 and 95% of the energy supplied to the furnace is supplied to the furnace via electric heating by means of the electrodes, and the balance by combustion. Furnaces whereby between 30 and 50% of the energy supplied to the furnace is supplied to the furnace via electric heating by means of the electrodes, while the remainder of the energy is supplied by combustion, may thus be considered either as boosted or hybrid furnaces.

A person skilled in the art will appreciate that, in such a process, whereby the furnace is heated by means of a combination of combustion and electric heating, the furnace may on occasion be heated only by combustion, such as during start-up, as is also customary for 100% electrical melting furnaces.

The use of electric heating to complement the heat generated by combustion increases the flexibility of the glass-melting furnace and makes it easier to adjust the heating of the furnace to changes in the composition of the glass-forming charge and/or to changes of the glass-production rate (pull rate), while maintaining the desired quality of the molten glass. Thus, by combining heating by combustion and electric heating, the process can be readily used and adjusted for the melting of glass-forming materials with or without recycled glass and for the melting of different types of glasses.

An additional consequence of combining heating by combustion and electric heating in the process according to the invention is that, for a same amount of heat produced, less combustion gas is generated. As a consequence the concentration of the $CO_2$ released by the charge during thermoprocessing is higher than in the case of a furnace heated only by combustion, thus making it easier to obtain a high-$CO_2$ flue-gas fraction to be combined with $H_2$ and sent to the rWGS reactor in accordance with the present invention.

A similar advantageous effect is obtained when, due to the preheating of oxidant and/or fuel and/or the drying and/or preheating of the glass-forming material, the need to supply heat to the furnace by means of combustion of fuel with oxidant is reduced.

By injecting the fuel and oxidant into the furnace at multiple locations so as to generate multiple flames, the flame coverage of the glass-forming material may be improved.

So-called flat flames, whereby the width of the flame parallel to the charge is smaller than the height of the flame perpendicular to the charge can also improve flame coverage of the charge.

Staged combustion or delayed combustion is a further means for providing improved flame coverage of the charge.

When the only fuel supplied to the process, as opposed to generated by the process, is hydrogen, the only carbon dioxide produced by the process is carbon dioxide which was originally released by the glass-forming material. This is also true for the carbon dioxide produced by the combustion of the rWGS reaction product obtained by subjecting the flue-gas fraction to the rWGS reaction with hydrogen.

In the glass-melting process according to the invention, a hydrocarbon-containing fuel, such as, for example, natural gas or biogas may also be supplied to the process in addition to the supplied hydrogen. Said additional hydrocarbon fuel may be injected into the furnace mixed with the rWGS reaction product and/or separately therefrom. In that case, the process not only generates carbon dioxide originally released by the glass-forming material in the furnace, but also carbon dioxide initially generated by the combustion of said additional fuel.

If a hydrocarbon fuel is supplied to the process, it is preferred to use, as additional fuel, a hydrocarbon-containing fuel produced from renewable sources in order to keep the carbon-footprint of the glass-melting process as low as possible.

The oxidant with which fuel is combusted may be air, though, as discussed earlier, an oxidant with a higher oxygen content than air is generally preferred.

Due to the reduced presence or even absence of the ballast gas nitrogen in such an oxygen-rich oxidant, the efficiency of the heating process is enhanced. A further advantage is that, again due to the reduced amount or absence of ballast gas, a flue gas with higher $CO_2$ concentration is evacuated from the furnace, which makes it easier to extract from said evacuated flue gas a $CO_2$-rich fraction to be subjected to the rWGS reaction with the supplied hydrogen.

An inconvenience normally encountered in the case of combustion with oxygen-rich oxidant, compared to combustion with air, is that it produces flames with a smaller volume, i.e. which cover a smaller surface area of the charge. This is, at least in part, compensated in accordance with the present invention by injection of the reaction product of the rWGS reaction as part of the fuel combusted in the furnace.

BRIEF DESCRIPTION OF THE DRAWING

For a further understanding of the nature and objects for the present invention, reference should be made to the following detailed description, taken in conjunction with the accompanying drawings, in which like elements are given the same or analogous reference numbers and wherein:

FIG. 1 shows a schematic flow diagram of a particular embodiment of the process according to the invention applied to a glass-melting furnace.

DETAILED DESCRIPTION OF PREFERRED EMBODIMENTS

Furnace 13 is a glass-melting furnace into which solid glass-forming material is continuously introduced at a feed end and from which molten glass is continuously withdrawn at the opposite end of the furnace (not shown). Furnace 13 is heated by the combustion of fuel with oxidant above the charge of glass-forming material, thereby introducing combustion gases into the furnace atmosphere.

In addition, electric power 10 may be supplied to electrodes (not shown) in furnace 13 to boost the heat supply to the furnace.

As the glass-forming material is heated and melts, it releases a range of compounds into the furnace atmosphere, including a significant amount of $CO_2$.

As the furnace is not air-tight, there is an inevitable ingress 11 of air into the furnace, said ingress air forming also part of the furnace atmosphere.

The thus obtained mixture of gases is continuously evacuated from the furnace as flue gas stream 6 at a temperature of about 1450° C. The $CO_2$ content of the evacuated flue gas stream 6 lies around 42% vol.

Residual heat is recovered from evacuated flue gas stream 6 in heat exchanger 6*a*, whereby the temperature of the flue gas decreases to about 512° C., i.e. well above the condensation temperature of the water vapour present in said flue gas stream 6.

Cooled flue gas stream 6*b* is divided into two parts: recycle flue gas stream 12 and rest stream 8, which is evacuated from the process. The need to evacuate rest stream 8 from the process arises in particular because new $CO_2$ is continuously released by the charge in furnace 13 and evacuated therefrom as part of the flue gas. Without rest stream 8, the amount of $CO_2$ in the process would continue to accumulate. Such a purge is also required to evacuate nitrogen introduced by the ingress air from the process. Rest stream 8 may, for example, be subjected to one or more cleaning steps before being released into the atmosphere. However, if possible, rest stream 8 will be subjected to CCUS, as a further measure to reduce the carbon footprint of the glass-melting process.

In condenser 15, recycle stream 12 is further cooled to cause water to be condensed therefrom, thereby increasing the $CO_2$ content in the gaseous phase. The condensed water is removed as stream 5.

The at least partially dehumidified recycle stream 7 has a $CO_2$ content of around 70% vol and is sent to rWGS reactor 14.

In addition to recycle stream 7, hydrogen stream 3 is also sent to rWGS reactor 14, where $CO_2$ from recycle stream 7 reacts with hydrogen from stream 3 as follows:

$$CO_2+H_2\leftrightarrows CO+H_2O.$$

The resulting rWGS reaction product stream 9, which contains both CO and $H_2$, is injected as fuel into furnace 13 to generate a flame coverage of the glass-forming material in furnace 13, which more closely resembles the flame coverage obtained by means of combusting hydrocarbon fuel, than would a hydrogen flame, but without the additional $CO_2$ emissions of hydrocarbon combustion.

A stream 2 of oxygen-rich oxidant, more specifically industrial purity oxygen, is preheated in heat exchanger 2*a* before the preheated oxidant stream 2*b* is sent to furnace 13 and injected therein as combustion oxidant for the combustion of fuel.

Optionally, $CO_2$ from an external source may also be supplied to rWGS reactor 14 in addition to recycle stream 7. In the illustrated embodiment, additional $CO_2$-containing stream 4 is mixed with hydrogen stream 3 in static mixer 16 and the mixed $H_2$+$CO_2$ stream is supplied to rWGS reactor 14, where it is combined with recycle stream 7 and subjected to the rWGS reaction.

Optionally, additional fuel(s) may be supplied to furnace 13, in addition to rWGS reaction product stream 9. In the illustrated embodiment, additional fuel stream 1 is preheated in heat exchanger 1*a* and preheated additional fuel stream 1*b* is sent to furnace 13 and injected therein so as to be combusted in the furnace with part of preheated oxidant stream 2*b*.

Additional fuel stream 1, 1*b* may be a hydrocarbon-containing fuel stream, preferably made from renewable origin. Additional fuel stream 1, 1*b* may advantageously also be a hydrogen stream which is injected into furnace 13 without first being subjected to the rWGS reaction.

Reference number 17 designates the heat recovery assembly of the illustrated process. By means of said heat recovery assembly, residual heat present in evacuated flue gas stream 6 is recovered by means of heat exchanger 6*a* and used (a) as a heat source for the rWGS reaction in reactor 14, (b) as a heat source for preheating oxidant stream 2 in heat exchanger 2*a* and (c) when additional fuel is supplied to the furnace, as a heat source for preheating additional fuel stream 1 in heat exchanger 1*a*.

In the simplified schematic representation of the FIGURE, the different steps of the heat-recovery process are shown separately for reasons of clarity. However, it will be appreciated that, as discussed earlier, the heat recovery step of heat exchanger 6*a* is necessarily connected with heat supply steps to the rWGS reaction in reactor 14 and the preheating steps of heat exchangers 1*a* and 2*a* which rely on the heat recovered in the heat recovery step. In addition, any one of said steps may consist of multiple substeps. For example, the heat recovery step of heat exchanger 6*a* may comprise a high-temperature heat recovery substep followed by a low temperature heat recovery substep. A person skilled in the art will, however, appreciate, as also discussed hereabove, heat recovered during different heat-recovery substeps may be used in different heat supply steps. The step of supplying recovered heat to the rWGS reaction in rWGS reactor 14 may, for example, consist of supplying heat to reactor 14 or may also comprise a substep of heating dehumidified recycle stream 7 upstream of rWGS reactor 14.

It will be appreciated that embodiments of the type illustrated in FIG. 1 are not limited to glass-forming processes, but may be applied to other methods for thermoprocessing a charge, whereby the charge releases $CO_2$ during thermoprocessing and whereby high-temperature flue gas, containing said released $CO_2$ is evacuated from the furnace in which said thermoprocessing takes place.

By using the process according to the invention, the $CO_2$ which is released by the glass-forming material, which normally contributes to the energy losses of the glass-melting process, is at least in part recycled and used to improve the heating of the charge in the furnace. In addition, the invention also permits an optimized use of the residual heat present in the furnace flue gas.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

The invention claimed is:

1. A process for thermoprocessing a charge, comprising:

introducing a non-gaseous charge to be thermoprocessed into a furnace, heating the furnace by means of combustion of fuel with oxidant, said fuel and oxidant being supplied to the furnace at regulated supply rates, generating an atmosphere in the furnace, said atmosphere comprising of a gaseous mixture comprising (a) combustion gas generated by the combustion of the fuel with the oxidant and (b) carbon dioxide released by the charge during thermoprocessing, withdrawing the thermoprocessed charge from the furnace and evacuating the gaseous mixture as flue gas from the furnace, wherein hydrogen is supplied to the process and a non-zero fraction of the flue gas containing at least 50% vol and at most 100% vol $CO_2$ is combined with at least part of the supplied hydrogen and subjected to a reverse water-gas shift (rWGS) reaction with said hydrogen in a rWGS reactor, wherein at least part of the $CO_2$ in the fraction is converted into CO, and:

the reaction product of the rWGS reaction is supplied to the furnace as part or all of the fuel to be combusted, wherein the process is a glass-melting process and solid glass-forming material to be melted is introduced into the furnace as the non-gaseous charge to be thermoprocessed, carbon dioxide is released into the furnace atmosphere by the glass-forming material during thermoprocessing. and wherein the molten glass is withdrawn from the furnace as the thermoprocessed charge.

2. The process according to claim 1, the fraction of the flue gas further comprising:

at least 80% vol $CO_2$, and/or from 0 to 20% vol $H_2O$.

3. The process according to claim 1, wherein the fraction of the flue gas is a dehumidified flue-gas fraction.

4. The process according to claim 1, wherein heat is recovered from the evacuated flue gas and supplied to the rWGS reaction.

5. The process according to claim 4, wherein heat recovered from the evacuated flue gas is supplied to the rWGS reaction by using said recovered heat to heat the fraction of the flue gas upstream of the rWGS reactor and/or to heat the at least part of the supplied hydrogen upstream of the rWGS reactor and/or to heat the combined fraction of the flue gas and the at least part of the supplied hydrogen upstream of the rWGS reactor and/or to heat the rWGS reactor.

6. The process according to claim 1, wherein heat is recovered from the evacuated flue gas and used for:

oxidant preheating, and/or fuel preheating, and/or drying and/or preheating of the charge to be thermoprocessed.

7. The process according to claim 1, wherein a further part of the hydrogen supplied to the process is injected into the furnace as additional fuel admixed with and/or separately from the reaction product of the rWGS reaction.

8. The process according to claim 1, wherein a gaseous hydrocarbon-containing fuel is supplied to the process and injected into the furnace as additional fuel admixed with and/or separately from the reaction product of the rWGS reaction.

9. The process according to claim 7, wherein the amount of additional fuel injected into the furnace is automatically regulated so that an instantaneous combustion heat requirement of the furnace is met by the combustion of the reaction product of the rWGS reaction together with the combustion of the injected additional fuel.

10. The process according to claim 1, wherein the oxidant has an oxygen content of 70% to 100% vol.

11. The process according to claim 1, wherein the fuel is combusted with the oxidant in multiple flames and/or by staged combustion.

12. The process according to claim 1, wherein the furnace is heated simultaneously by means of:

a) the combustion of fuel with oxidant, and b) electrodes immersed in the glass-forming material.

13. The process according to claim 12, wherein between 5 and 50% of the energy supplied to the furnace is supplied to the furnace by means of the electrodes.

14. The process according to claim 12, wherein between 30 and 95 of the energy supplied to the furnace is supplied to the furnace by means of the electrodes.

* * * * *